Figure 3:
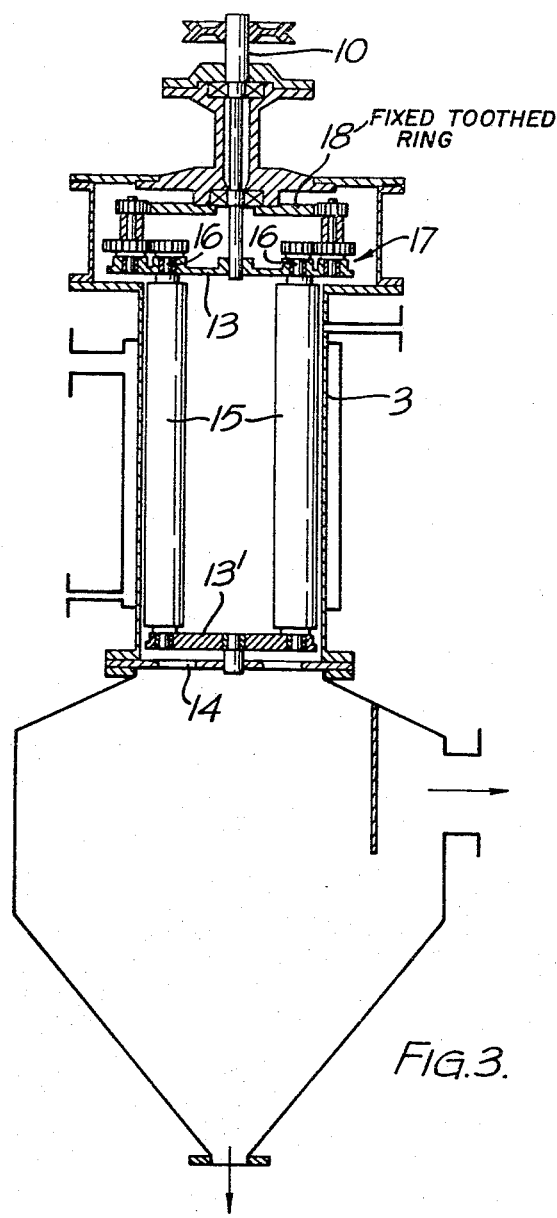

Aug. 8, 1967 T. McMANUS 3,334,680
ROTARY WIPED FILM EVAPORATOR
Filed June 7, 1965 6 Sheets-Sheet 1
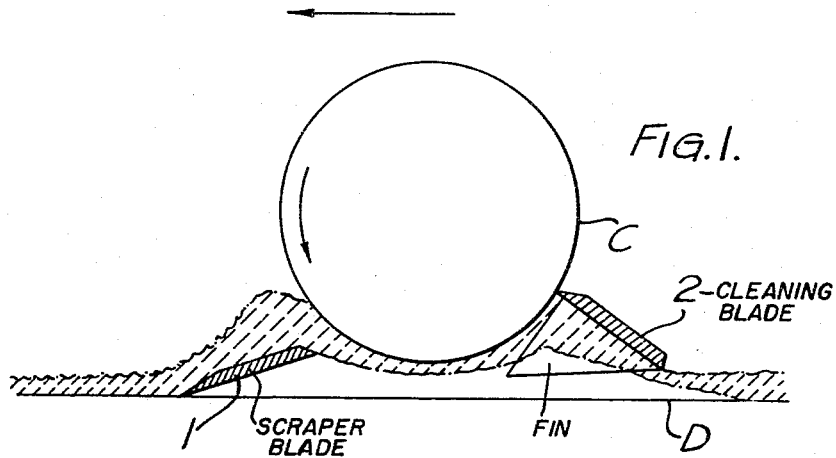
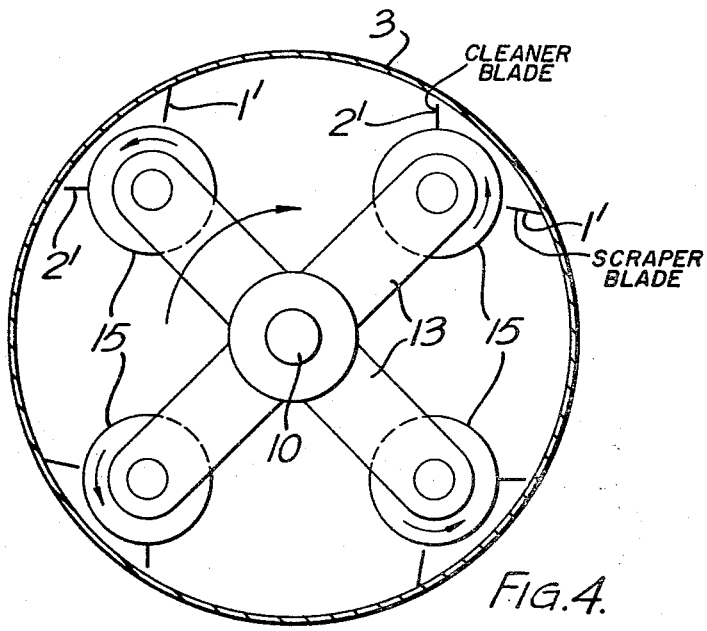
Inventor:
Thomas McManus
By Baldwin & Wight
Attorneys

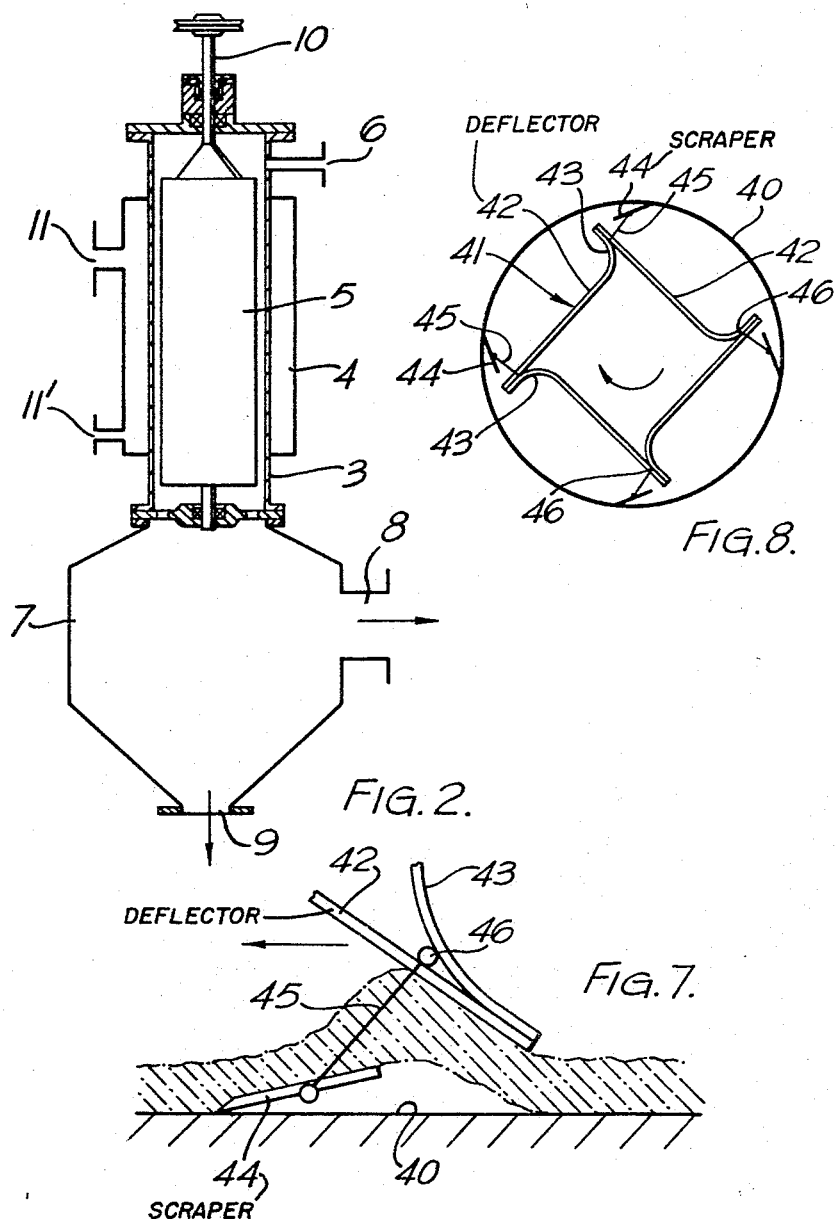

Aug. 8, 1967  T. McMANUS  3,334,680
ROTARY WIPED FILM EVAPORATOR
Filed June 7, 1965  6 Sheets-Sheet 3

Inventor:
Thomas McManus
BY Baldwin & Wight
Attorneys

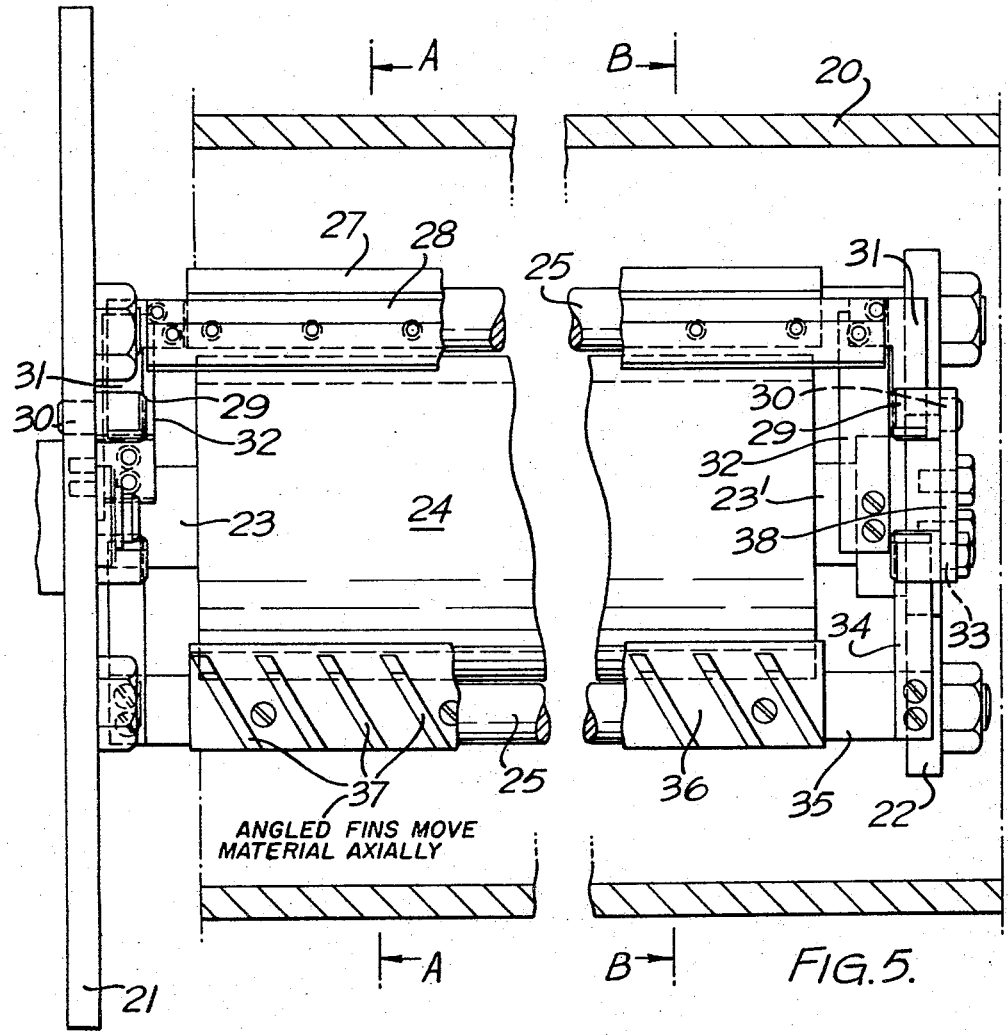

United States Patent Office 3,334,680
Patented Aug. 8, 1967

3,334,680
ROTARY WIPED FILM EVAPORATOR
Thomas McManus, Thornaby-on-Tees, England, assignor to Head, Wrightson and Company, Limited, Thornaby-on-Tees, England, a corporation of United Kingdom
Filed June 7, 1965, Ser. No. 461,918
9 Claims. (Cl. 159—6)

This invention relates to film evaporators of the type comprising an evaporator tube, which is usually vertical, on to the interior surface of which tube material to be processed is fed, e.g. by means of a spray or drip feed and so arranged that the material is moved to the lower end of the tube under the action of gravity or other means where it is collected. In passing down or along the tube, which is heated or cooled externally by means of liquid or vapour circulating through a surrounding jacket or by electrical means, the liquid can be processed, concentrated or reacted.

In conventional evaporators where material transport through the unit is effected by gravity or centrifugal force, viscous liquids flow very slowly if at all. In such units heat transfer rates are very low due to the lack of turbulence, and only by resort to larger evaporating surfaces and higher heating temperature can high evaporation rates be obtained. However, these methods cannot be used for many viscous organic materials which are degraded on prolonged exposure to high temperatures. For such materials no suitable form of evaporator has yet been manufactured.

According to the present invention a film evaporator of the type set out is so constructed as to be operable for performing, in an improved manner, a method which comprises stripping the film from the evaporating surface, depositing it on a relatively movable surface within the tube and transferring it from said surface to the surface of the tube.

In carrying out the invention as applied to a film evaporator tube, the step of stripping the film from the evaporating surface of the tube and returning it thereto may be performed more than once for each revolution of the relatively movable surface within the tube, the number of transfers from and to the surface of the evaporator tube depending upon its diameter.

Provision may also be made for effecting displacement of the film in an axial direction as it is being transferred to the surface of the tube.

According to the present invention film evaporator apparatus comprises an outer tube member, which may be horizontal or vertical, concentrically mounted to revolve, within which is an inner rotor member or a plurality of rotor members and in the annular space between said members or each one of said rotor members and the outer tube member, there are provided two series of scraper blades, which are movable in unison in a direction opposite to the direction of rotation of the rotor member or members, the two series of blades being so arranged that one will scrape the inner surface of the jacketed tube, and the other will scrape the outer surface of the rotating inner rotor.

In one embodiment of the invention the unit comprises a jacketed evaporator tube and an inner roll which may be hollow and heated or cooled by passage of steam or water or other medium through it.

A film evaporator apparatus according to one embodiment of the invention comprises a heated vertically disposed evaporator tube, mounted within which for relative rotational movement, is at least one rotor assembly having one or more rotor elements, scraper means being provided for stripping the film of material from the evaporator tube and depositing it on the surface of the rotor element or elements, from which it is subsequently removed by a second scraper means and redeposited on the surface of the tube.

In practice, the rotor element, which may consist of a cylinder or of a multisided member is arranged to extend lengthwise of the main evaporator tube and the scraper means consists of a scraper blade for initially stripping the material from the tube surface and a cleaning blade placed in the path of the layer of material deposited on the rotor element in order to detach the same and redeposit it on the tube wall, the rotor element, scraper blade and cleaning blade forming a scraper unit.

Figure 6:
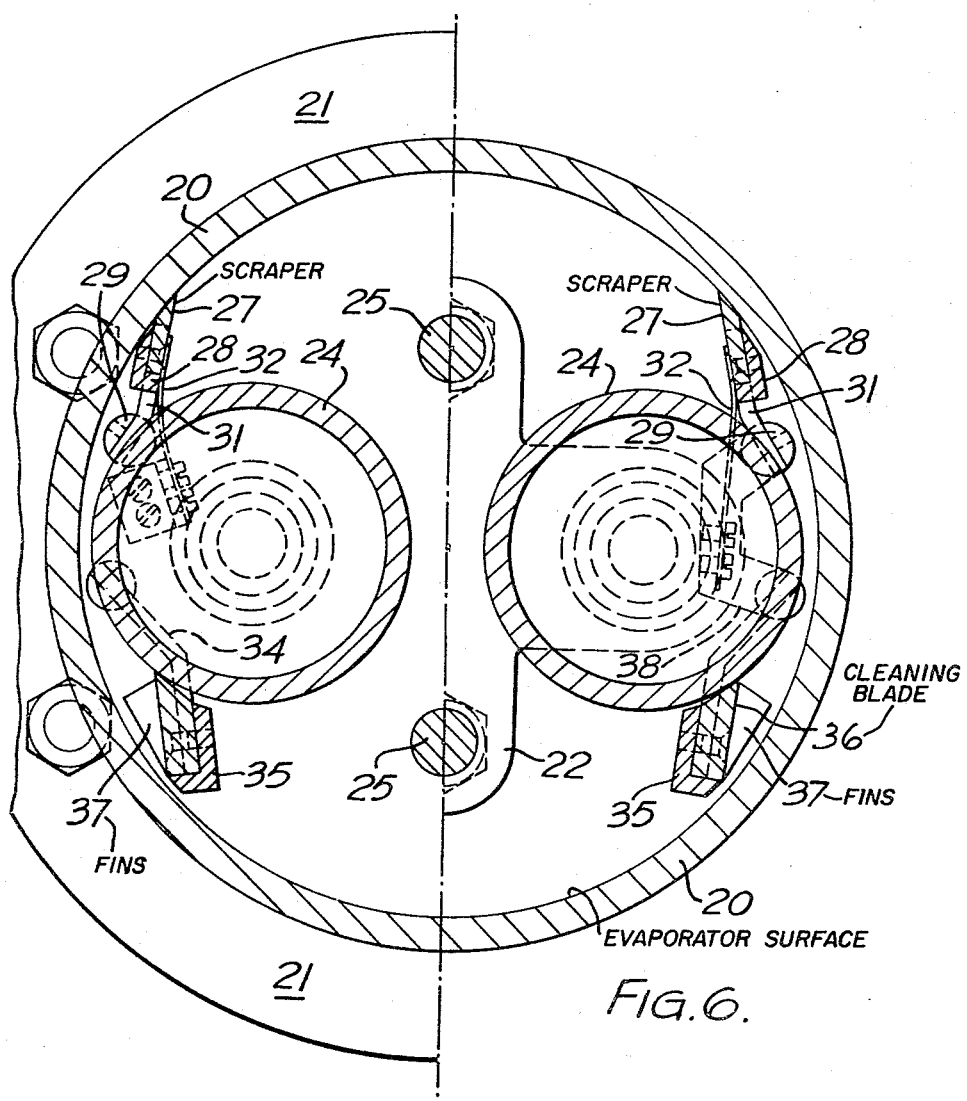
Figure 9:
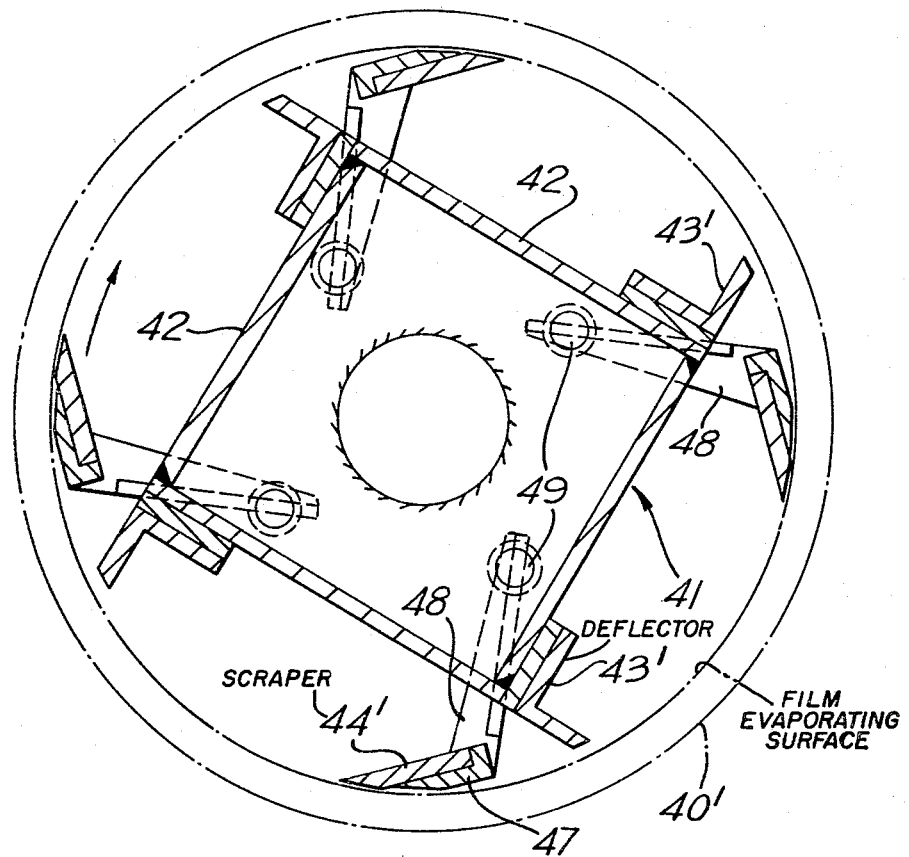

The invention is illustrated in the accompanying drawings in which:

FIGURE 1 is a diagrammatic sectional view illustrating one method of operation of a film evaporator in accordance with this invention, FIGURE 2 is a diagrammatic vertical section of a film evaporator apparatus having a rotor assembly comprising a single cylindrical element or roll, FIGURE 3 is a sectional elevation showing film evaporator apparatus constructed in accordance with a further embodiment of the invention, having a rotor assembly comprising a plurality of cylindrical elements or rolls, FIGURE 4 is an horizontal section corresponding to FIGURE 3, FIGURE 5 is a longitudinal section through film evaporator apparatus having a rotor assembly comprising two cylindrical elements or rolls, FIGURE 6 shows two half transverse sections in the direction of the arrows A—A, B—B of FIGURE 5, FIGURE 7 is a diagrammatic sectional view showing an alternative method of operation of a film evaporator apparatus in which transfer of the film to the evaporator tube is dependent upon centrifugal force, FIGURE 8 is a section showing film evaporator apparatus having a rotor assembly comprising a multisided tubular element for operation in accordance with the method of FIGURE 7, FIGURE 9 is a transverse section through a film evaporator apparatus which is a modification of the embodiment of the invention shown in FIGURES 7 and 8.

Referring first to FIGURE 1, there is shown at D the development of the inner surface of the evaporator tube of a transfer film evaporator, mounted within which is a rotor assembly in the form of a cylindrical element or roll C.

In the method of operating the film evaporator, according to this invention, the viscous liquid, which is deposited as a film on to the surface D, is stripped from the surface by means of a relatively movable scraper blade 1, the film as illustrated, being deposited on the surface of the roll C, from which it is then removed by a cleaning blade 2 and transferred back to the inner surface D of the evaporator tube.

In carrying out the invention as applied to a film evaporator tube, the step of stripping the film from the evaporating surface D of the tube and returning it thereto may be performed more than once for each revolution of the rotor assembly, the number of transfers from and to the surface of the the tube depending upon its diameter.

Provision may also be made for effecting displacement of the film in an axial direction as it is being returned to the surface of the tube.

Referring now to FIGURE 2 there is shown a film evaporator apparatus comprising a vertical cylindrical evaporator tube 3 surrounded by a heating jacket 4, within which tube 3 there is mounted for relative rotational movement a rotor assembly comprising a cylinder or roll 5 associated with which are scrapers in the form of blades, there being at least one blade 1 as shown in FIGURE 1 extending lengthwise of the scraper assembly for scraping the liquid off the surface of the tube 3 and continuously depositing it on the surface of the cylinder or roll 5, from which it is then removed and transferred back to the surface of the tube 3 by a cleaning blade 2 as shown in FIGURE 1.

Material to be treated is introduced to the tube 3 through a feedstock inlet 6 at its upper end, which connects with a pump (not shown). On entry of the material it will coat the interior surface of the evaporator tube 3; during its passage from top to bottom the material is continuously transferred, causing evaporation, the evaporated vapour being extracted through a disengaging section 7 having an outlet 8 for vapour and a bottom opening 9 for the concentrate.

The rotor assembly is journalled to rotate in upper and lower bearings and includes a drive shaft 10. Reference numerals 11 and 11' indicate inlet and outlet connections for heating water or steam.

Referring now to FIGURES 3 and 4 the drive shaft 10 of the rotor assembly has attached to it a four armed spider 13, a corresponding spider 13' being supported to revolve in suitable bearings in a bridge piece 14 in the lower end of tube 3. Trunnion type bearings in each pair of arms of spiders 13, 13', support for rotation, cylindrical rolls 15, each roll 15 having an extended drive spindle 16 driven through a gear train 17 in mesh with a toothed ring 18 fixed to the structure rotatably supporting the shaft 10, by which it is caused to revolve, as the rotor assembly turns within the tube 3.

As can be seen from FIGURE 4 the support assembly, comprising the spiders 13 and 13', rotates clockwise and the four rolls 15 anti-clockwise, i.e. in the opposite direction.

Each roll has deposited upon it a film of liquid which is scraped off the inner cylindrical wall of the heated evaporator tube 3 by means of a scraper blade 1' which is attached to the support assembly. After being deposited on the roll 15, as the latter revolves, the deposited film is peeled off by a cleaning blade 2' which is attached to the support assembly and is transferred back to the surface of the tube 3, this operation being repeated for each of the rolls 15.

Referring now to FIGURES 5-6, there is shown an evaporator tube 20 within which is mounted a rotor assembly comprising L.H. and R.H. support plates 21, 22 which are bolted to one another by tie bolts 25.

Mounted to revolve about diametrically opposite axes 23, 23', in the L.H. plate 21 and R.H. plate 22, the latter being cruciform in shape, are cylinders 24.

Both the scraper and cleaning blades are pivotally mounted and for this purpose each wall scraper blade 27 is attached by being secured to an L-shaped backing plate 28, which in turn is carried by a pivot arm 31. The arm 31 is adjustably held in the headed end 29 of a slotted pivot pin 30, the reduced end of pin 30 being free to pivot in holes drilled respectively in the end plate 21, and a two armed bracket 38 bolted to the R.H. end plate 22.

Blade springs 32 serve to apply the necessary thrust to press the edge of the blade against the surface of the evaporator tube, the spring 32 at the R.H. end being screwed to a shoulder on the axle member 23'. At the L.H. end the spring 32 is secured to a block attached to end plate 21.

The mounting for the cleaning blades 36 comprises similar sloted pivot pins 33, pivot arms 34 and angled backing plates 35, the cleaning blades 36 being arranged so that their leading edges engage the cylinders 24, while their trailing edges are spaced from the surface of tube 20. In order to ensure axial movement of the liquid, the cleaning blades 36 are provided with angled fins 37 so that the liquid is transferred back to a different section of the surface of the evaporator tube 20.

Referring now to FIGURES 7 and 8, the evaporator tube is indicated at 40, the tube being heated externally by means of condensing vapour or hot liquid contained within a surrounding jacket similar to the arrangement shown in FIGURE 2 or e.g. by means of an electrical resistance winding.

Mounted to revolve within the tube 40 is a rotor assembly in the form of a mult-sided tubular member 41 made up of four lengths of sheet metal so as to form a square section, each side terminating in a curved portion 43. Pivotally attached to the rotor assembly are scraper blades 44, each blade being attached to the member 41 by means of a lever arm 45 so arranged that there is one blade at each corner, each arm 45 being pivotally attached to the structure 41 at 46 and at its other end to the blade 44. It will be seen that the curved portion 43 of each side 42 joins with the trailing edge of the previous side 42 so that the two sides form a wiper blade or deflector with the result that the material as it builds up on the plates 42 is thrown off by centrifugal force and is thereby transferred by a wiper action back to the surface of the evaporator tube 40.

Referring to FIGURE 9 the tubular member 41 is made up of four flat plates 42 and in place of the curved ends 43, angle brackets 43' are provided at each corner to transfer material, as it builds up on each of the side plates 42, back on to the inner surface of the tube 40'.

The scraper blades, indicated at 44', are attached to backing plates 47 carried on the ends of swinging arms 48 pivotally mounted at 49 to the top and bottom plates of the member 41.

In operation the whole assembly is rotated at centrifugal speeds up to 2000 r.p.m. The hinged scraper blades, which precede the wiper sections of the member 41 by a short distance, make contact with the tube wall due to centrifugal force. The material being processed, having been supplied to the inner surface of the heated evaporator tube through a suitable opening as in the arrangement of FIGURE 2 is removed from the surface of the tube by the scraper blades, and accumulates on the underside of the adjacent wiper blade or deflector as shown in FIGURE 7. Here, due to the considerable centrifugal force to which the material is subjected, the material is caused to slide outwardly off the blade and is transferred back to the surface of the evaporator tube.

For those materials which will not flow satisfactorily through the evaporator tube under gravity, the apparatus can be modified in two ways:

(1) The cleaning blades may have small fins attached to them as shown in FIGURES 5 and 6 in such a way that material passing over the blades is deflected or ploughed downwards and out of the evaporator.

(2) The evaporator tube and rotor assembly can be arranged to taper outwards in the direction of motion of the material. In this way the rotational motion of the rotor assembly will assist in removing the processed material from the evaporator tube.

It will be found that the evaporator unit according to the embodiment of the invention of FIGURES 8 and 9, is capable of handling all but the most viscous of liquids normally requiring processing. For extremely viscous materials the use of a unit according to the embodiments of FIGURE 2, or FIGURES 3 and 4, and FIGURES 5 and 6 are more suitable.

In these latter units, the scraper blades prevent the build up of a stagnant liquid film on the evaporator tube surface, and the scraper-wiper arrangement combined with the high rotational speed of the rotor assembly creates a very high degree of turbulence. This increased turbulence will enable very high evaporation rates and low residence times to be maintained with materials whose viscosity and heat sensitivity prevent effective concentration in other transfer film evaporators.

It should be understood that whereas in the foregoing embodiment, the evaporator tube or chamber is arranged vertically and relies mainly upon gravity for movement of the viscous liquid through the chamber, this is not essential and the chamber can be horizontal or vertical.

What is claimed is:

1. In film evaporator apparatus, the combination of an evaporating tube having an internal cylindrical evaporating surface, a scraper unit mounted to revolve within said tube about an axis coincident with the centre line of the tube, a plurality of rolls rotatably supported by said scraper unit for rotation about parallel axes which are eccentric to that of said tube; means for imparting rotation to the scraper unit and for simultaneously causing said rolls to revolve about their own axes oppositely to the direction of rotation of said scraper unit, and a pair of scraper elements associated with each roll, one of each of said scraper elements making engagement with said evaporating surface to remove the film of material thereon and deposit it on the surface of the associated roll and the other of each pair of said scraper elements being in engagement with said roll surface for transferring material deposited thereon to the evaporating surface.

2. Film evaporator apparatus as claimed in claim 1 in which fin means is provided on the scraper elements for effecting axial displacement of the material in transferring the same from the rolls to the evaporating surface.

3. Film evaporator apparatus comprising an evaporator tube having a cylindrical inner evaporating surface, on to which material to be processed is deposited as a film, a scraper assembly mounted to revolve within the tube about an axis coincident with its centre line, said assembly comprising end plates, at least one pair of rolls mounted to revolve in bearings in the end plates, means for imparting rotational movement to the scraper assembly and for causing said rolls to revolve, scraping devices associated with each roll, each device including blades extending parallel to the axis of the roll, one blade being adapted to have scraping engagement with the inner surface of the evaporator tube to remove the film thereon and transfer it to the roll surface, and the other blade being adapted to have scraping engagement with the roll so that the material deposited thereon will be returned to the inner surface of the evaporating tube.

4. Film evaporator apparatus as claimed in claim 3 in which the blades of the scraping devices are pivotally supported at their ends between the end plates and are maintained in engagement with the inner surface of the evaporating tube by spring means.

5. A film evaporator apparatus comprising an evaporator tube having an internal cylindrical evaporating surface onto which material to be processed is deposited as a film, a rotor assembly concentrically mounted for rotation within said evaporator tube, said rotor assembly including a tubular member of polygonal cross-section providing extended surfaces, each of said extended surfaces incorporating a co-planar wiper blade extending parallel to the rotor axis and extending outwardly toward said evaporating surface, a scraper element operatively associated with each of said extended surfaces and extending lengthwise of said rotor assembly, said scraper elements being arranged to enter into scraping engagement with said evaporating surface to remove said film therefrom and to deposit it on said extended surfaces, and means for rotating said rotor assembly at a speed of rotation such that said film is caused to be transferred, via said wiper blades, back to said evaporating surface by the action of centrifugal force.

6. Film evaporator apparatus comprising an evaporator tube having an internal cylindrical evaporating surface onto which material to be processed is deposited as a film, a rotor assembly concentrically mounted for rotation within said evaporator tube about an axis coincident with that of said evaporator tube, said rotor assembly having means presenting at least one continuous surface extending parallel to said axis which is spaced from said evaporating surface, means for rotating simultaneously said rotor assembly and its continuous surface means, a plurality of pairs of scraper elements extending lengthwise of and attached to said rotor assembly, one of said scraper elements of each of said pairs being arranged to enter into scraping engagement with said evaporating surface to remove said film of material and to deposit it on said continuous surface, and the other of said scraper elements of each of said pairs being arranged to enter into scraping engagement with said continuous surface to transfer said film of material back to said evaporating surface.

7. Film evaporator apparatus as claimed in claim 6, in which said continuous surface comprises a single cylindrical structure mounted coaxially within and in spaced relation with said evaporating surface and said axis, said scraper elements operating in the space between said cylindrical structure and said evaporating surface.

8. Film evaporator apparatus as claimed in claim 6, in which said continuous surface means comprises a plurality of rollers mounted for rotation about axes parallel to the axis of said rotor assembly, said rollers being spaced from one another and from said evaporating surface, wherein one pair of said scraper elements is operatively associated with each of said rollers and operates in the space between its roller and said evaporating surface.

9. Film evaporator apparatus comprising an evaporator tube having an internal cylindrical evaporating surface, onto which material to be processed is deposited as a film, a rotor assembly mounted for rotation within said evaporator tube about an axis coincident with that of said evaporator tube, said rotor assembly having means presenting at least one extended surface which is spaced from said axis and said evaporating surface but relatively close to the latter, means for rotating simultaneously said rotor assembly and its extended surface means, means for continually moving said film of material from said evaporating surface to said rotor extended surface, and other means for transferring said film of material from said rotor surface back to said evaporating surface, whereby said film of material is continually moved from said evaporating surface across said space between said extended surface and said evaporating surface and back to the latter.

References Cited

UNITED STATES PATENTS

| | | | |
|---|---|---|---|
| 2,211,740 | 8/1940 | Dietrich | 159—5 |
| 2,500,900 | 3/1950 | Madlen | 202—205 |
| 2,542,270 | 2/1951 | Zahm | 159—6 |
| 2,546,381 | 3/1951 | Zahm | 159—6 |
| 2,993,842 | 7/1961 | Smith | 159—6 |
| 3,020,211 | 2/1962 | Smith | 159—6 |
| 3,054,444 | 9/1962 | Robbins | 159—6 |
| 3,058,516 | 10/1962 | Brunk | 159—6 |

NORMAN YUDKOFF, *Primary Examiner.*

J. SOFER, *Assistant Examiner.*